United States Patent [19]

Riffe

[11] Patent Number: 5,346,373

[45] Date of Patent: Sep. 13, 1994

[54] REFRIGERATION COMPRESSOR HAVING A SPHERICAL DISCHARGE VALVE

[75] Inventor: Delmar R. Riffe, Cullman, Ala.

[73] Assignee: White Consolidated Industries, Inc., Cleveland, Ohio

[21] Appl. No.: 52,761

[22] Filed: Jun. 17, 1993

[51] Int. Cl.⁵ .................. F04B 39/10; F16K 15/14
[52] U.S. Cl. .................. 417/415; 417/569; 137/851; 137/535; 137/539
[58] Field of Search .......... 417/415, 569, 577; 137/851, 535, 539

[56] References Cited

U.S. PATENT DOCUMENTS

| | | |
|---|---|---|
| 640,488 | 1/1900 | Philpott .................. 417/569 |
| 1,652,978 | 12/1927 | Enock .................... 417/569 |
| 1,922,379 | 8/1933 | Longfellow .............. 137/539 |
| 3,324,673 | 6/1967 | Lindahl et al. ........... 137/539 |
| 3,424,198 | 1/1969 | Erbach .................. 137/539 |
| 4,368,755 | 1/1983 | King ................... 137/512.3 |
| 4,543,989 | 10/1985 | Lorson . | |
| 4,711,269 | 12/1987 | Sule ................... 137/625.5 |
| 4,723,896 | 2/1988 | Fritchman . | |
| 5,149,254 | 9/1992 | Riffe . | |

FOREIGN PATENT DOCUMENTS

| | | | |
|---|---|---|---|
| 1453528 | 2/1969 | Fed. Rep. of Germany | 417/569 |
| 290240 | 5/1991 | Fed. Rep. of Germany | 417/569 |
| 47111 | 4/1979 | Japan | 417/571 |
| 159701 | 12/1979 | Japan | 417/569 |
| 184769 | 11/1982 | Japan | 137/539 |
| 221078 | 12/1983 | Japan | 137/535 |

*Primary Examiner*—Richard A. Bertsch
*Assistant Examiner*—Roland G. McAndrews, Jr.
*Attorney, Agent, or Firm*—Pearne, Gordon, McCoy & Granger

[57] ABSTRACT

A small single cylinder hermetic refrigeration compressor has a flat valve plate extending across the end of the cylinder. A discharge port is formed in the valve plate with a spherical valve seat and a spherical poppet member is moveable to and from the valve seat. A flat leaf spring and valve stop member fit over the poppet to control its motion and the spherical head of the popper, when closed, extends beyond the surface of the valve plate in alignment with a mating recess on the piston head to minimize the clearance space of the compressor.

15 Claims, 7 Drawing Sheets

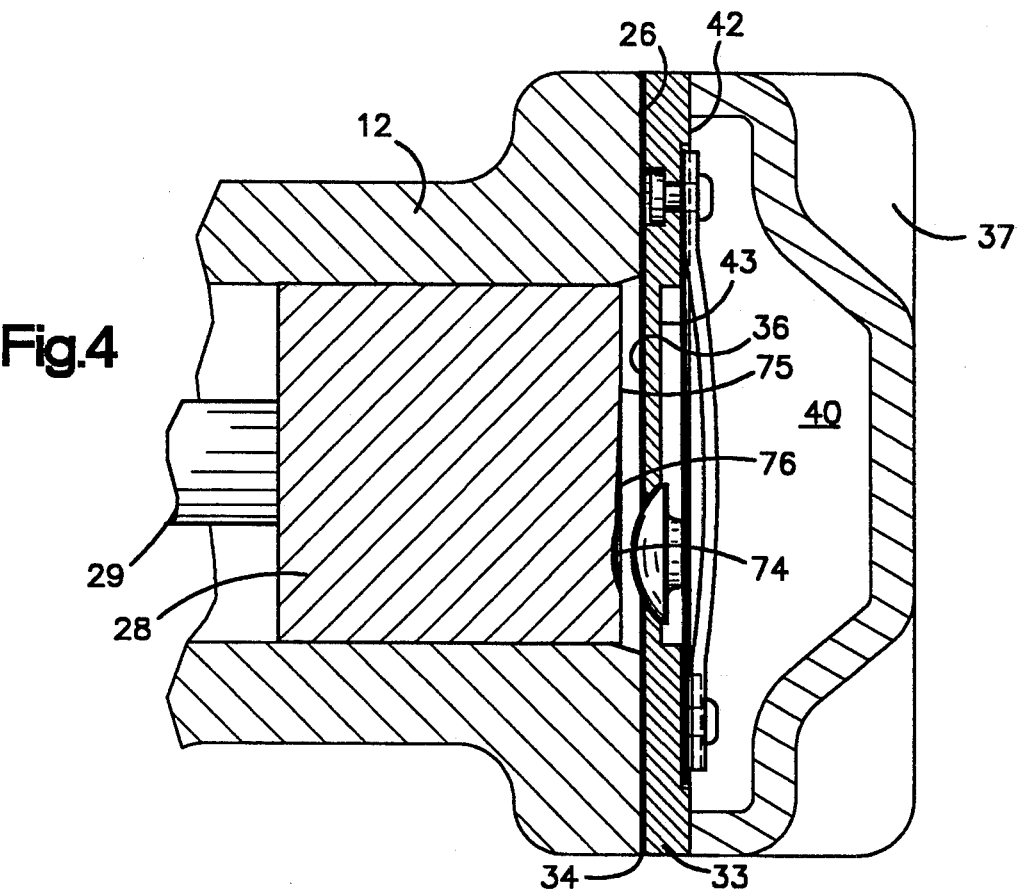
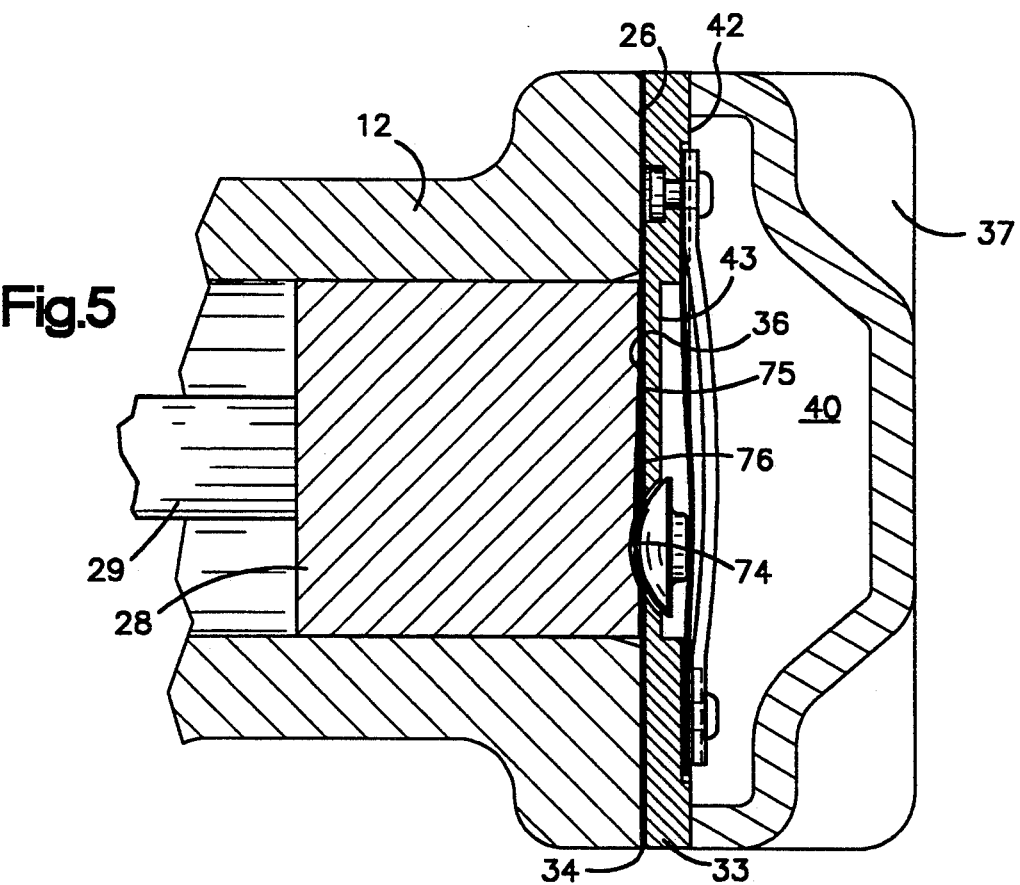

5,346,373

REFRIGERATION COMPRESSOR HAVING A SPHERICAL DISCHARGE VALVE

BACKGROUND OF THE INVENTION

This invention relates generally to refrigeration compressors, and more particularly to hermetic refrigeration compressors of the fractional horsepower type used in household appliances such as refrigerators and freezers.

There has been a continuing need for increased energy efficiency in these appliances and one area where much improvement has been obtained is in the hermetic compressor. While much of the improvement has been in the electric motor portion of the compressor, there still remains further room in the area of volumetric and compression efficiency of the reciprocating piston compressor.

One of the factors affecting the volumetric efficiency of these compressors is the clearance or re-expansion volume of the pumping cylinder, which is defined as the volume of space within the pumping cylinder when the piston is at top center or the end of its pumping stroke. This space consists essentially of the space between the piston face and the valve plate on which the suction and discharge reed valves are mounted as well as the volume of the discharge port extending through the valve plate. Since the discharge valve reed valve is on the outer side of the valve plate, and the valve plate must have a certain minimum thickness to give it the required strength, the volume of the discharge port necessarily is a major portion of the total clearance volume. The ideal compressor would have no clearance volume, and generally, the greater the clearance volume, the lower the efficiency of the compressor. The reason that clearance volume adversely affects efficiency is that this volume constitutes gases that require additional work or energy for compression on the working stroke of the piston, and this energy is only partially recovered through reexpansion on the suction stroke as the cylinder is refilled through the suction port. Thus, reduction of the clearance volume will increase the efficiency of the compressor as long as other factors are not also adversely affected.

Since the clearance volume consists mostly of the above-described two components, efforts to reduce this volume have taken the form of minimizing the distance between the piston face and the valve plate, or more specifically, the valve sheet incorporating the suction valve reed. As for the volume of the discharge port, the diameter cannot be reduced below a certain minimum because this would increase the restriction on discharge flow, and the length of the port must be sufficient in terms of valve plate thickness for the necessary strength to resist the forces of the compressed refrigerant. While some port length reduction has been accomplished by recessing the discharge valve in the valve plate as disclosed in U.S. Pat. No. 4,723,896, granted Feb. 9, 1988 to J. F. Fritchman and assigned to the assignee of the present invention, it is still necessary to have a sufficient thickness of the valve plate material so that the discharge port remains a substantial portion of the total clearance volume.

Another approach to the matter of reducing the clearance volume of the discharge port has been to provide a plug or projection on the piston face that extends into and therefore partially fills the discharge port. This can be done as shown in the present inventor's U.S. Pat. No. 5,149,254, granted Sep. 22, 1992, but this arrangement has a relatively high cost of manufacture and still requires clearance between the sides of the plug and the wall surface of the port itself.

Still another approach has been to provide a valve which projects beyond the actual sealing valve seat into the discharge port itself to substantially fill the volume between the valve member and the piston. In the case of large, higher power compressors this has been accomplished using a centrally positioned poppet valve and a surrounding ring type suction valve. The discharge valve may take the form of either a guided poppet or as free poppet positioned by a biasing spring and a large conical valve seat with the dimensions of the poppet allowing the flat face of the poppet to extend close to the face of the piston. Examples of this arrangement are shown in U.S. Pat. Nos. 4,368,755 and 4,543,989. However, these arrangements have not been found to be applicable to the much smaller household refrigeration compressors and their limited size and simple construction.

SUMMARY OF THE INVENTION

The preferred embodiment of the present invention provides a novel spherical discharge valve which substantially eliminates the clearance volume of the discharge port. The compressor is of the single cylinder type with the open end of the cylinder closed off by a flat valve plate. The suction valve is in the form of a thin sheet of spring steel extending between the valve plate and the cylinder block with the sheet cut away to form the suction valve and to provide an open area around the discharge port. The discharge port itself is formed as a spherical valve seat in the form of the segment of a sphere defined by the planes of the inner and outer sides of the valve plate with the edge where the valve seat intersects the inner face of the valve plate being chamfered to eliminate the sharp edge.

The valve is in the form of a floating or loose poppet with a fully spherical head having the same radius of curvature as that of the valve seat. On the side away from the head, the poppet has a short cylindrical shank or boss terminating in a flat end face perpendicular to the axis of the poppet. A flat, leaf-shaped valve spring extends across the poppet shank and may either contact or be spaced slightly away from the poppet end face to bias the poppet to the closed position, while a rigid stop member is secured to the valve plate above the spring and poppet to limit the travel of the valve poppet in the opening direction.

Because the poppet has a full spherical shape, the center of the poppet extends through the discharge port beyond the inner side of the valve plate when the poppet is in the closed position. While this substantially eliminates the clearance volume of the discharge port, it is necessary to provide an appropriately sized depression on the face of the piston to give the necessary minimum working clearance to prevent contact between the valve poppet and the piston. In addition to the depression on the piston face, the piston face around this depression may also be slightly recessed or relieved as disclosed in the aforesaid U.S. Pat. No. 5,149,254.

Preferably, the poppet is made of a high-performance plastic material such as a graphite filled polyimide resin which is resistant to high temperatures and attack by refrigerants, while providing high sealing compliance. Because the valve seat and the poppet head are formed to the same radius of curvature, the poppet can rotate relative to the valve seat without affecting its sealing ability, although the biasing force applied to the end face by the valve spring does give a centering action.

BRIEF DESCRIPTION OF THE DRAWINGS

FIG. 4 is a view similar to FIGS. 2 and 3 showing the discharge valve beginning to open;

FIG. 5 is a view similar to FIGS. 2-4 showing the piston at the end of its stroke with the discharge valve fully open;

DETAILED DESCRIPTION OF THE PREFERRED EMBODIMENTS

Figure 1:
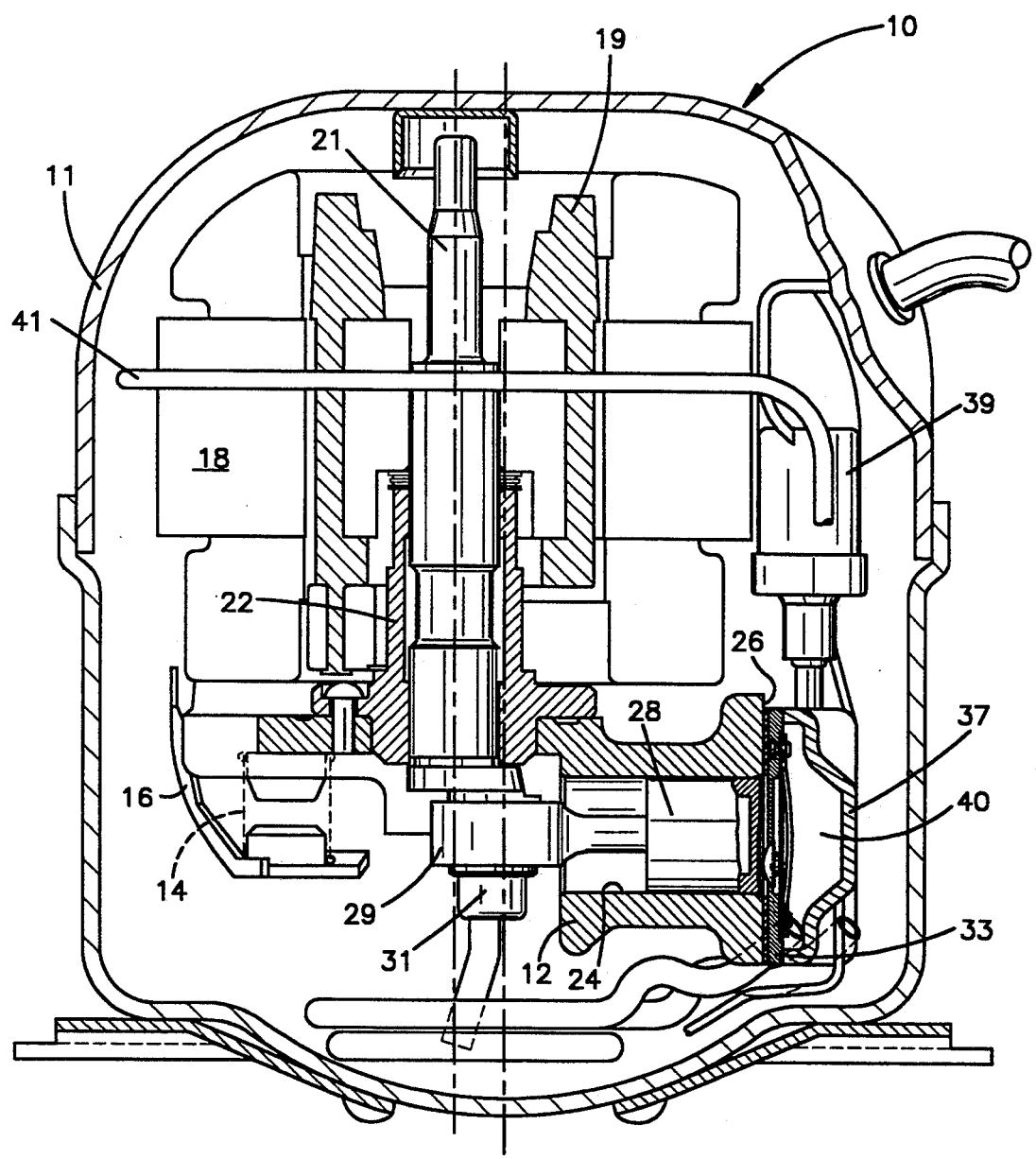
FIG. 1 is an elevational cross sectional view of a refrigeration compressor incorporating a preferred embodiment of the present invention.

Referring now to the drawings in greater detail, and in particular to FIG. 1, a refrigeration compressor 10 of the single cylinder, reciprocating piston, hermetic type includes a metal shell 11 within which is mounted a cylinder block 12 resiliently supported on springs 14 resting on support arms 16 secured to the inside of the shell 11. The electric motor driving the compressor includes a stator 18 which is secured directly on the upper surface of cylinder block 12. A rotor 19 is positioned within the stator 18 and is carried by a rotatable crank shaft 21 journalled in a bearing hub 22 at the center of the cylinder block.

The cylinder block 12 includes a horizontally extending cylinder 24 which is bored through the block from end to end in radial alignment with the crank shaft 21 and terminates at its outer end with an end face 26 formed on the cylinder block and lying in a plane perpendicular to the axis of cylinder 24. A piston 28 is slidably mounted within the cylinder 24 with a sealing fit and is connected in the usual fashion by a connecting rod 29 to a crank 31 on crank shaft 21 so that as the crank shaft 21 is rotated, the piston 28 reciprocates in the cylinder 24 to and from the end face 26.

A valve plate 33 is mounted on the end face 26 to extend completely across the cylinder 24 and the surrounding portions of the end face, and a suction valve sheet 34 of thin spring steel is mounted on the inner side or surface 36 of the valve plate between the valve plate and the cylinder block end face 26. A cylinder head 37 is secured on the outer side of valve plate 33 and generally extends over the entire valve plate to provide both a suction and discharge plenum. The suction plenum (not shown) is supplied with refrigerant gas from the return line through a suction muffler 39 and allows suction gases to flow through a suction port shown at 38 (see FIG. 7) past a reed type suction valve formed in the valve sheet 34 to allow the cylinder to be filled when the piston is on the suction stroke. The major portion of the cylinder head 37 is taken out by the discharge plenum 40 which is connected through suitable mufflers (not shown) to a discharge line 41 to connect with the exterior of the shell 11.

Figure 7:
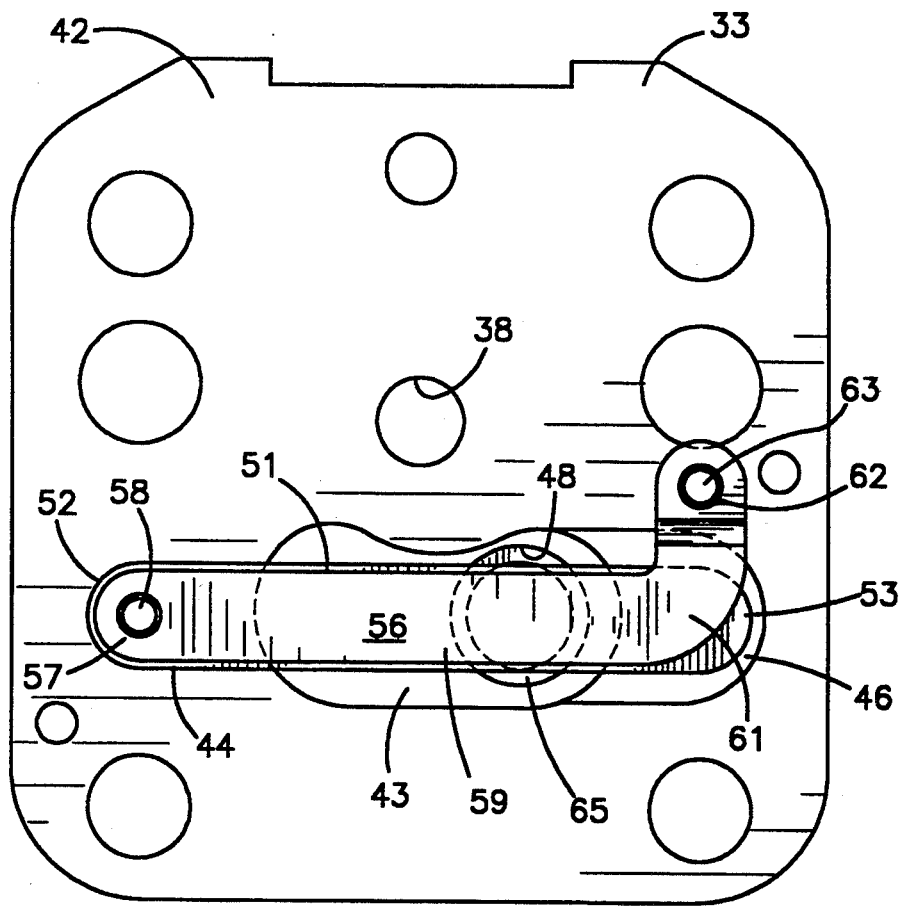
FIG. 7 is an enlarged plan view of the valve plate with the discharge valve mechanism in place.
Figure 8:
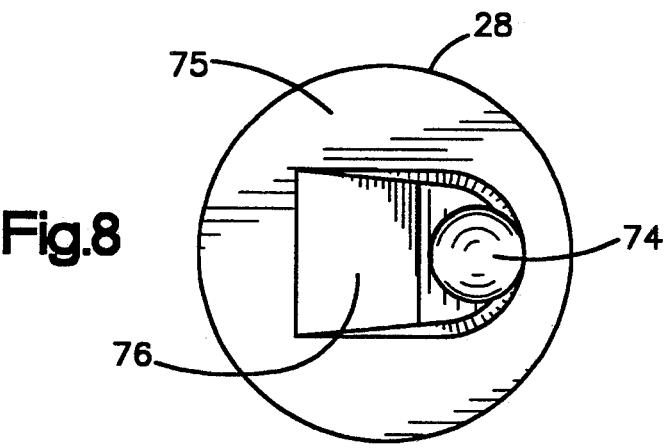
FIG. 8 is an end view of the piston.

The valve plate 33 has a discharge recess 43 on the outer side or surface 42 within the discharge plenum 40. The purpose of the discharge recess 43 is to allow the valve plate 33 to be thinner in this area for reducing the height of the valve structure and improving gas flow as will be described in greater detail hereinafter. There is a relief portion on each side of the recess 43 of lesser depth below the outer surface 42. Thus, relief portion 44 extends in the one direction, toward the left as seen in FIG. 7 and is relatively narrow, while a wider relief portion 46 of the same depth as portion 44 extends to the right and has a width substantially the same as that of the recess 43. The discharge port 48 is located in the recess 43 adjacent the right hand relief portion 46. A flat leaf valve spring 51 extends transversely across the recess 43 into both of the relief portions 44 and 46. The spring has a width only slightly less than that of the left relief portion 44 so that when the spring end 52 is fitted within relief portion 44, lateral movement of the other end 53 within the relief portion 46 is quite limited so that the spring is held laterally in position.

A rigid stop member 56 is fitted over the spring 51 and has an end 57 within the relief portion 44 where a rivet 58 extends through suitable openings in both the stop member 56 and the spring end 52 to be fastened in the valve plate 33 and firmly clamp these members together and hold the stop member and the spring in position. The center section 59 of the stop member 56 is shaped to convey upwardly with a curved portion extending over recess 43 from the one end 57 to the other end 61 within the other relief portion 46. A lateral projection 62 extends from the end 61 of the stop member and is slightly offset downwardly toward the valve plate so that it is in abutting contact therewith. A rivet 63 is secured to the valve plate 33 to hold the projection 62 and the adjacent end of the stop member in place. Thus, it will be seen that the stop member 56 is rigidly secured at both ends to the valve plate while the spring 51 is secured only at the one end 52, while the other end 53 has limited vertical travel between the relief portion 46 and the stop end 61.

The valve seat 65 is formed around the discharge port 48 within the recess 43 and is spherical in shape so that a sphere of the correct diameter will make surface abutting contact with the entire surface of the valve seat. A suitable chamfer 66 is formed between the valve seat 65 and the inner side 36 of valve plate 33 both to improve the flow characteristics through the port and to eliminate any sharp edges and except for the chamfer, the valve seat extends from the full thickness of the valve plate at recess 43. A valve poppet 68 has a spherical head 69 with the spherical surface preferably extending over the entire surface of head 69 up to an edge 70 defining a rear face 73. However, it should be noted that only the portion of head 69 that contacts valve seat 65 need be spherical and the center portion could be flattened or otherwise made non-spherical. A short cylindrical shank 71 extends upward from head 69 and terminates in a relatively flat end face 72 adjacent the valve spring 51. The spherical radius of the head 69 is made equal to that of the valve seat 65 so that when the poppet 68 is seated in place, the head 69 makes surface abutting contact with the entire spherical surface of the valve seat. With this arrangement, it can be seen that the poppet 68 can actually rotate a limited distance about its center of curvature and still make sealing contact, although the surface abutting contact between the end face 72 and the spring 51 tends to hold the poppet in an aligned position.

Although the actual length of travel of the valve poppet 68 to and from the valve seat 65 is relatively small, the fact that it is operating at a high speed of about 3450 oscillations per minute in accordance with the speed of the compressor motor, makes it important that the mass of the poppet be as low as possible. This is particularly important since the only force for opening the valve is the gas pressure within the pumping cylinder, while the pressure in the discharge planum 40 also provides an important factor in the closing movement of the poppet to assist the force supplied by the valve spring 51. Because of this need for low mass, it has been found that high strength polymeric materials which retain their properties at the high temperatures at which the poppet is exposed are the preferred materials for the valve poppet 68. At the present time, the preferred material for the valve poppet 68 is a polyimide resin sold under the trademark "VESPEL" from the Dupont company of Wilmington, Del. This material is available in a number of different grades and while a graphite filled grade such as SP-22 has been used and would appear to be particularly adapted for the poppet in view of its low coefficient of thermal expansion and the lubricating properties provided by the graphite filler, nevertheless, the unfilled resin of grade SP-1 has been found to give superior results with a high degree of consistency.

In order to provide positive sealing, it has been found to be quite important to have an extremely smooth finish on both the poppet head 69 and the valve seat 65 even though it would appear that the usual presence of an oil film in these areas from the lubricating oil of the compressor would provide an adequate seal. Thus, it has been found that preferably the valve seat 65 should have a surface finish no greater than six micro inches while the valve poppet head 69 should have at least a twelve micro inch maximum surface finish. It should be noted that the diameter of the edge 70 on head 69 should be greater than the maximum diameter of the valve seat 65 at the recess 43 to ensure that even if the poppet rotates somewhat away about the center of curvature of the head 69, there will still be full abutting surface contact over the entire valve seat 65.

This configuration ensures that the valve head 69 will project beyond the inner side 36 of the valve plate 33. For this reason, the piston end face 75 is provided with a spherical recess 74 in alignment with the valve poppet 68 to avoid any possible contact between the piston and the valve poppet while maintaining the clearance volume at an absolute minimum. In addition, the piston end face 75 is preferably provided with a sloping clearance recess 76 around the spherical recess 74 to allow improved flow of the refrigerant gas as the piston end face 75 approaches top dead center to allow an even greater reduction in the clearance volume as shown and discussed in the aforesaid U.S. Pat. No. 5,149,254.

The operation of the poppet valve can most clearly be seen through FIGS. 2-5. During normal operating conditions, when pressures throughout the system have stabilized, the typical household refrigerator or food freezer will have a compressor high side or discharge pressure that is about 8 to 10 times the low side or suction pressure. The suction pressure determines the pressure within the pumping cylinder as the piston begins its compression stroke, since the filling is done through a pressure operated reed suction valve, and the piston must move a sufficient distance that the gas pressure within the cylinder is greater than that on the discharge side within the discharge planum 40 before the discharge valve can open. This means that the piston must have moved through most of its stroke compressing the gas within the cylinder before any opening movement of the discharge valve can take place.

Figure 2:
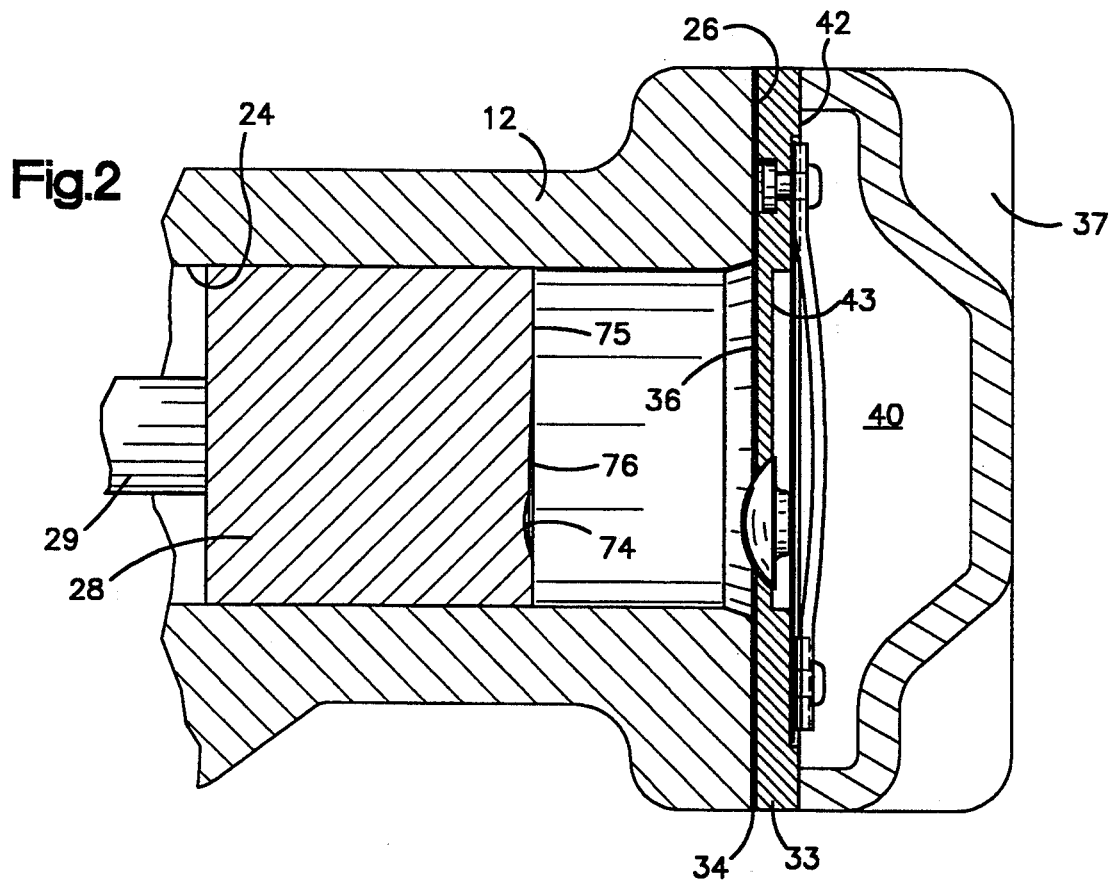
FIG. 2 is an enlarged fragmentary cross sectional view through the piston, cylinder and valve plate showing the location of the piston near the beginning of the compression stroke.

When the piston is near the bottom of the stroke as shown in FIG. 2, the discharge valve is closed with the poppet 68 in tight sealing engagement with the valve seat 65. The valve spring 51 will have the free end 53 resting against the relief portion 46 and in this position, it has been found desirable to have a slight clearance between the end face 72 of the poppet and the spring 51. This clearance is not detrimental to sealing because the basic sealing force holding the poppet against the valve seat is the pressure within the discharge plenum 40 rather than any force applied by the spring 51, whose primary purpose is to provide the initial closing force near the full open position moving the poppet toward engagement with the valve seat rather than actually holding the valve in the closed position.

Figure 3:
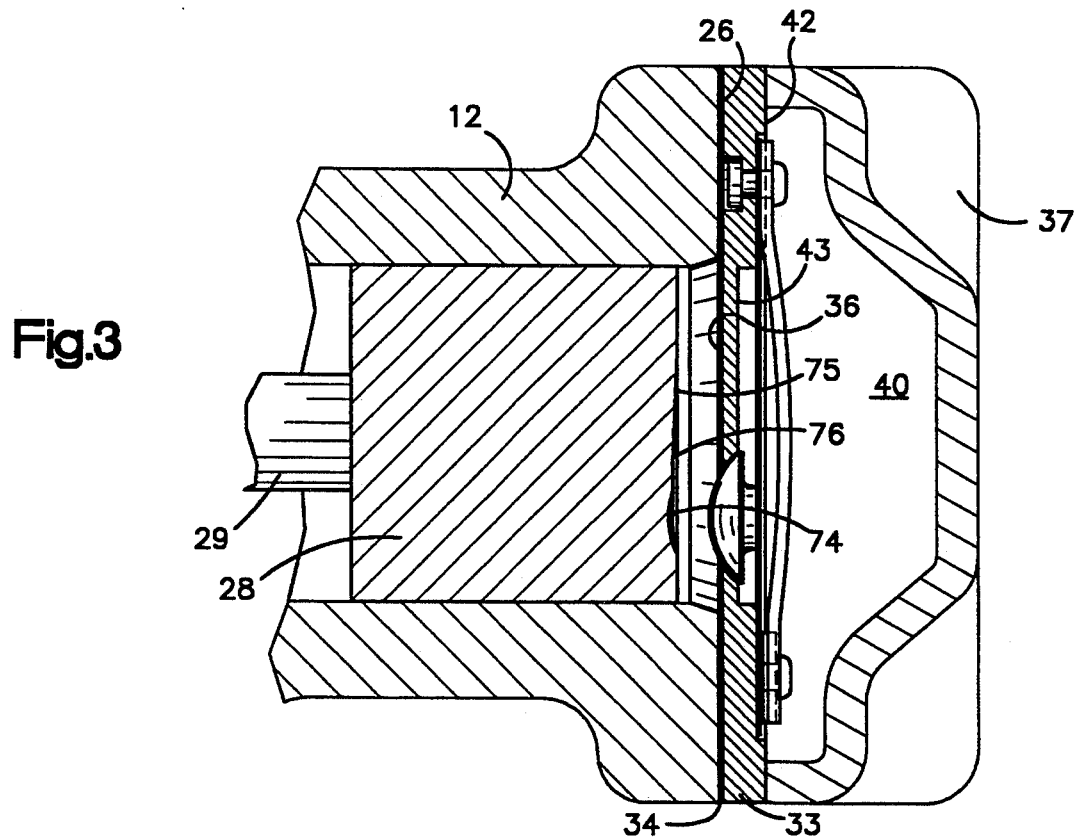
FIG. 3 is a view similar to FIG. 2 but showing the piston near the end of the stroke just before the discharge valve begins to open.
Figure 6:
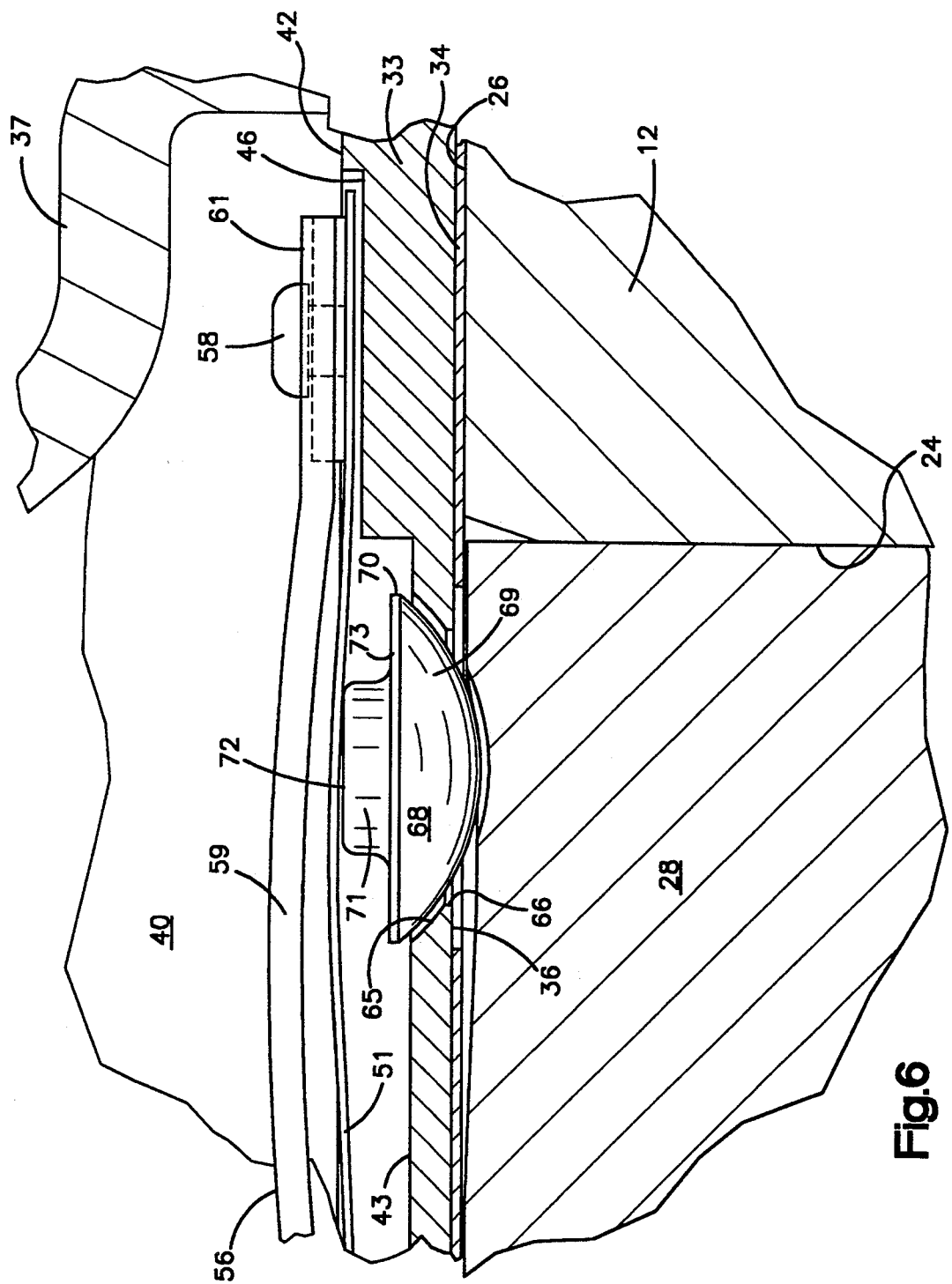
FIG. 6 is an enlarged fragmentary cross sectional view similar to FIG. 5 showing details of the piston and discharge valve.

When the piston has reached a position near the end of its stroke, such as shown in FIG. 3, the pressure within the cylinder then equals the pressure in the discharge plenum 40 allowing the poppet 68 to move out of sealing engagement with the valve seat. If no force is applied by the spring 51, the primary force that must be overcome is the adhesion forces caused by an oil film present between the poppet 68 and the valve seat 65. With the poppet free to move a short distance, perhaps in the range of 0.1 millimeters, before contacting the spring, the valve will then quickly begin to open at a minimum pressure differential determined solely by the adhesive forces caused by the oil film.

As the piston moves farther as shown in FIG. 4 where the pressure within the cylinder substantially exceeds that in the discharge plenum, the poppet is now able to move and begin to bend the spring so that the free end 53 of spring 51 moves out of contact with the relief portion 46 until it engages the underside of end 61 of stop 56. During this short amount of movement of the spring end 53, the spring force is determined solely by the flexing of the spring in cantilever form at the opposite end 52. However, once the spring end 53 engages the stop end 61, the spring is in effect held at both ends and its stiffness or rate greatly increases so that further movement of the poppet 68 must be done by bowing the center portion of the spring 51 up towards the center section 59 of stop member 56, as shown in FIG. 5. With this arrangement, the spring 51 has a progressive rate in that the rate increases when the poppet has the greatest travel as might occur during start up conditions where there is no back pressure in the discharge plenum 40. Thus, if the poppet opens a greater distance, there is a much greater spring force tending to close it and this force drops off to zero before the valve reaches the seat, and assuming there is clearance between the shank end face 72 and the spring 51 in the closed position, the completion of the closing forces results entirely from gas pressure plus the inertia of the poppet on its closing movement. Also, as the poppet is opened, the spring provides a minimum resistance to rapid opening to ensure that there will be adequate time to discharge the maximum amount of compressed gas into the discharge planum.

The present invention increases the efficiency of the compressor in basically two different ways. First of all, the fact that the poppet head is spherical, as is the valve seat, provides a clear flow path with minimum turbulence when the poppet is spaced away from the seat since there is less of a change of flow direction of the gas than that which occurs with a flat reed valve acting on a flat seat. Furthermore, it is possible to greatly reduce the clearance volume in the compressor as further described in the aforesaid U.S. Pat. No. 5,149,254. For the reasons set forth in that patent, the presence of the clearance recess 76 on the piston face 75 allows the remaining portion of the piston face to be allowed to come closer to the inner side of the suction valve sheet 34 to reduce the amount of clearance volume around the valve port. Furthermore, the fact that the valve poppet head 69 is allowed to project beyond the surface of the valve plate 33 and valve sheet 34 into the spherical recess 74 eliminates all but a minor portion of the clearance volume that is taken up by the discharge valve port in reed discharge valve compressors. Preferably, the spherical recess 74 is dimensioned so that when the piston is at top dead center or its closest approach to the valve plate 33, there will still be a minimum clearance space between the poppet head 69 and the recess 74 if the poppet were in the closed position fully seated against the valve seat 65. This ensures against any possibility of contact between the valve poppet and the piston under any conditions.

Figure 9:
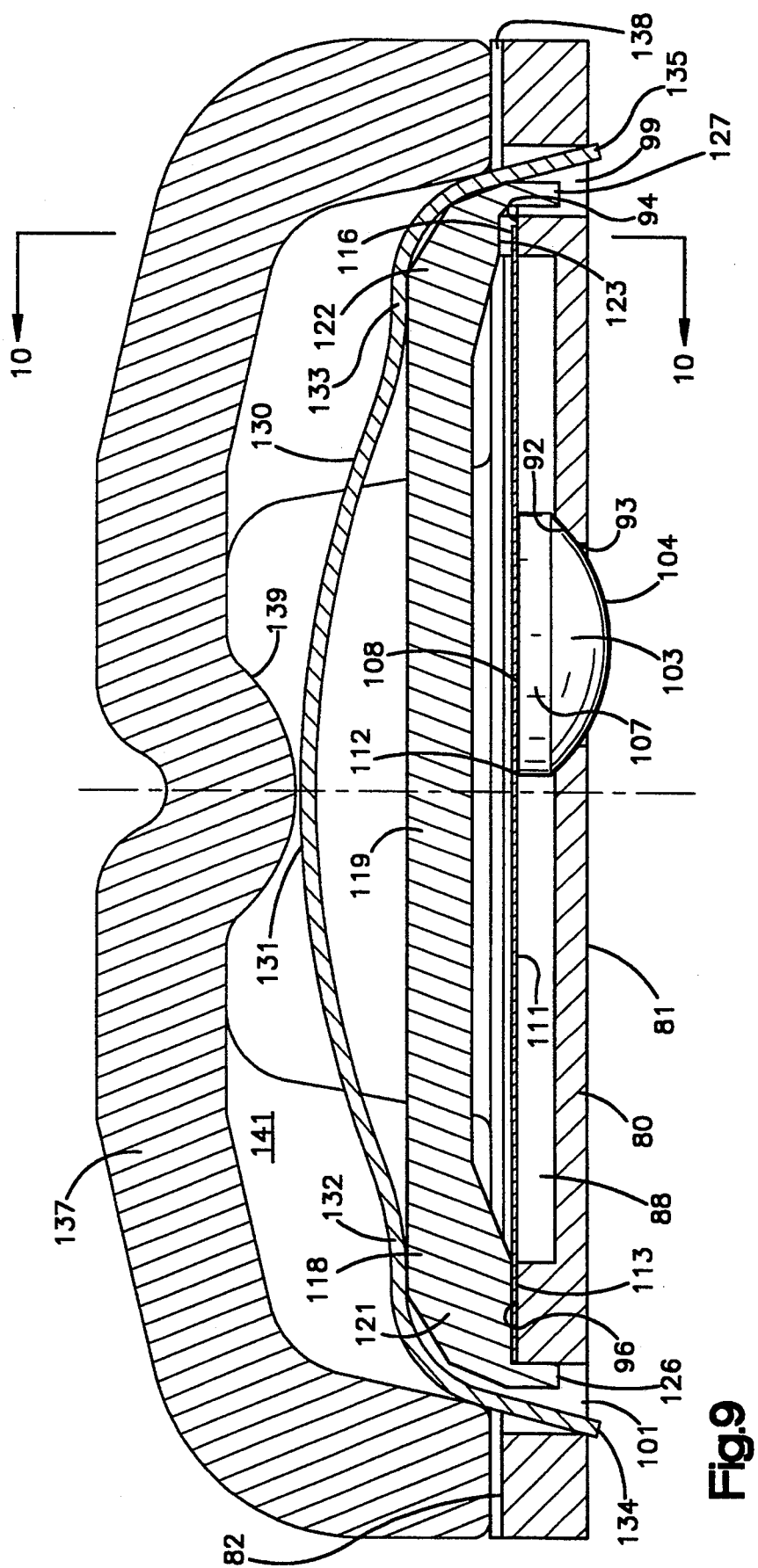
FIG. 9 is an enlarged cross-sectional view of the valve plate and discharge valve according to another embodiment of the invention.
Figure 10:
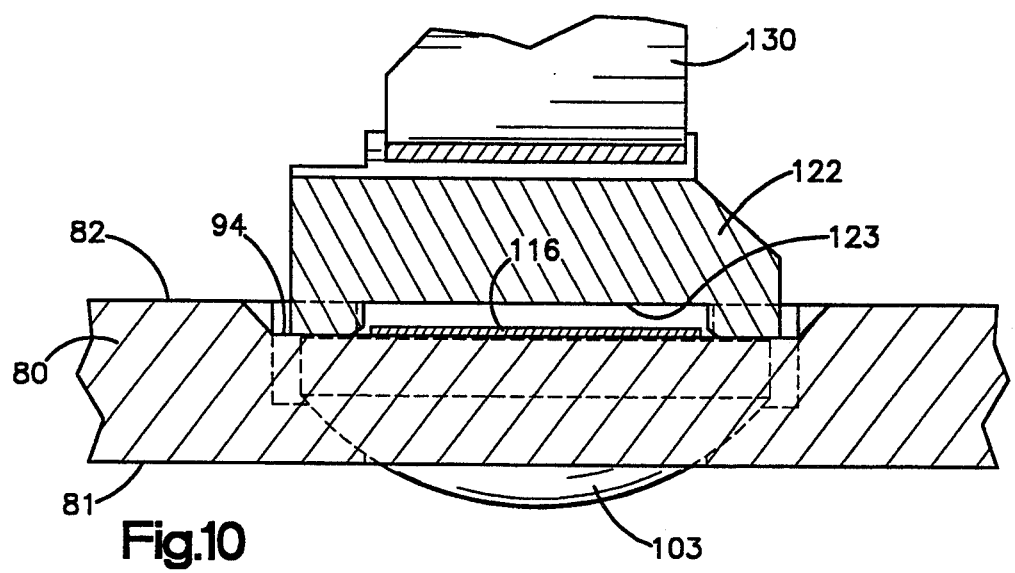
FIG. 10 is a cross-sectional view taken on line 10—10 of FIG. 9.
Figure 11:
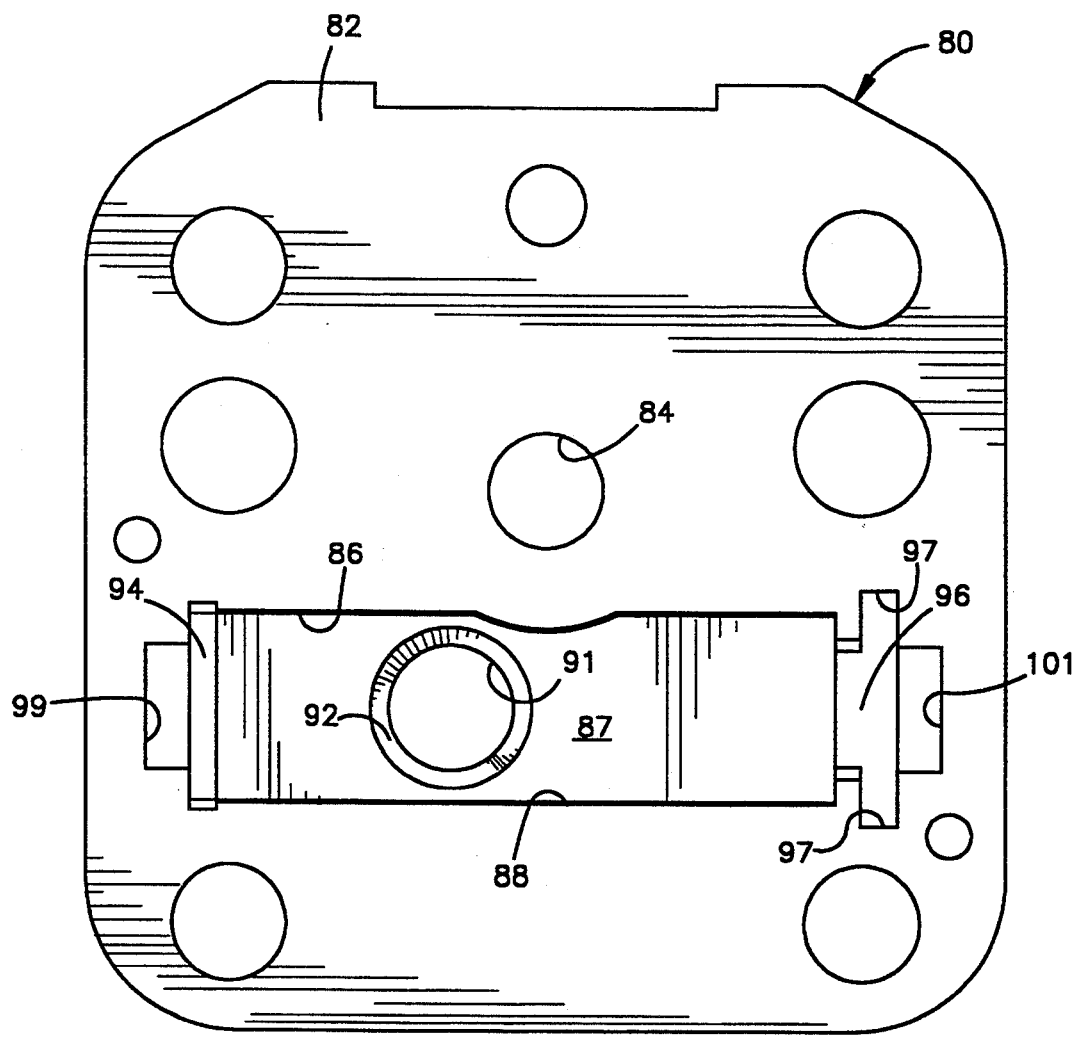
FIG. 11 is a plan view of the valve plate before assembly of the valve.

Another embodiment of the invention is shown on FIGS. 9-11 where the mounting arrangement for the poppet valve avoids rivets or fasteners which extend through the valve plate while allowing easy assembly. This embodiment generally has elements somewhat similar to the reed type discharge valve shown in U.S. Pat. No. 4,723,896, granted Feb. 9, 1988 to Jack F. Fritchman and assigned to the assignee of this application. The valve plate 80, except as described hereinafter, is generally similar to the valve plate 33 and has parallel inner and outer sides or surfaces 81 and 82, respectively. A suction port 84 extends through the valve plate to accommodate a reed-type suction valve (not shown). A recess 86 is formed in the upper surface 82 to include a bottom wall 87 extending parallel to the valve plate surfaces and generally defined by side edges 88. The bottom wall 87 is of substantially uniform depth throughout its main extent and generally serves to reduce the thickness of the valve plate in this area to allow the use of a smaller valve poppet which can therefore be of lower mass for a given diameter to insure rapid response of the poppet to open and closing forces. The discharge port 91 is positioned to one side of the recess 86, for reasons to be described later, and includes a spherical valve seat 92 having a chamfered edge 93.

At each end, the recess 86 is provided with slightly elevated support surfaces 94 and 96 which extend transversely of the recess and have surfaces lying in a plane parallel to the valve plate surfaces 81 and 82. In the area of the support surfaces 94 and 96, the valve plate has a greater thickness than in the area of the recess 86, while a lesser thickness than that of the portions of the valve plate out away from the recess 86. The support surface 96 has a pair of projecting recesses 97 to receive portions of a valve spring as will be described in greater detail hereinafter. At each end of the recess 86, outwardly of the support surfaces 94 and 96, the valve plate has rectangular openings 99 and 101 which extend completely through the valve plate.

The poppet 103 is preferably formed of the same material as poppet 68 but it is slightly different in shape. The poppet 103 has a spherical head 104 of the same radius of curvature as that of the valve seat 92 and of slightly larger diameter to ensure positive sealing engagement even if the poppet 103 is rotated out of precise alignment with the valve seat. Poppet 103 includes a base portion having a short cylindrical wall surface 107 together with a flat end face 108 having the full diameter of the base portion and a surface that extends perpendicular to the axis of the cylindrical surface 107. A flat leaf-type valve spring 111 extends across the recess 86 with the center portion 112 extending over the valve poppet end face 108. One end of valve spring 111 at 113 abuts on the support surface 96 and has a pair of extensions (not shown) which extend into the recesses 97 to hold the valve spring in position. The other valve spring end 116 normally rests in abutting contact with the support surface 94. The valve spring 111 is flat and normally in engagement with the two support surfaces 94 and 96 and may either contact the valve poppet end face 108 or have a slight clearance space therefrom as described hereinabove.

A rigid valve stop member 118 is mounted over the valve spring 111 and has a center section 119 spaced upwardly from the valve spring 111 to allow the valve spring to flex upwardly when the valve poppet moves away from the valve seat. At its one end 121, valve stop 118 abuts on the valve spring end 113 and clamps it against the support surface 96. The other end 122 of the valve stop is supported on the support surface 94 but has a recessed stop surface 123 spaced above the support surface 96 to allow a small amount of upward movement of the valve spring free end 116 away from support surface 94 during the preliminary opening movement of the valve poppet 103. This provides a progressive action so that when there is initial clearance between the valve poppet end face 108 and the valve spring 111, the initial movement of the poppet out of the valve seat will be resisted only by the fluid pressure differential acting across the poppet. Once any clearance is taken up, the valve spring 111 starts to flex by bending adjacent the head end 113 so that the free end 116 rises off the support surface 94 until it contacts the stop surface 123. At this point, further movement of the poppet faces greater resistance since the valve spring must flex entirely in the middle since both of the ends are now fixed in position.

To hold the valve stop 118 in position, a projecting tip 126 fits into the opening 101 adjacent the support surface 96 and preferably abuts the side of the opening 101 depositively position the valve stop with respect to the valve plate. At the other end, a tip 127 extends downward into the opening 99 adjacent support surface 94. To further hold the valve stop 118 in position, a heavy spring like keeper 130 fits over the valve stop with an arched center section 131. At one end 132, the keeper bears against the upper surface of valve stop 118 and has a tip 134 extending into the opening 101. The other end of keeper 130 has a similar shaped end 133 engaging the upper surface of valve stop 118 at end 122, and it in turn has a tip 135 extending into the opening 99. The discharge cylinder head 137 is held in place by bolts extending through the cylinder head, the valve plate and into the cylinder block and is separated by a gasket 138 from the valve plate to seal against escape of the discharge gases in the discharge planum 141 defined by the cylinder head 137 and valve plate 80. The cylinder head 137 is formed with a projecting boss 139 positioned to engage the center section 131 of keeper 130 when the cylinder head is clamped in place and thereby hold the keeper 130, valve stop 118 and the valve spring 111 clamped in place on the valve plate.

Although the preferred embodiment of the invention has been shown and described, it is recognized that other modifications and rearrangements may be resorted to without departing from the scope of the invention as defined in the claims.

I claim:

1. A discharge valve assembly for a refrigeration compressor comprising a valve plate having an inner face exposed to a compression space and an outer face exposed to a discharge space, said valve plate having a discharge port extending therethrough between said inner and outer faces, a valve seat surrounding said port on said outer face, said valve seat having a spherical surface, a valve poppet having a base portion with a flat surface facing away from said valve seat and a spherical head portion facing said valve seat, said valve seat and said head portion having the same radius of curvature so that said head portion makes surface abutting sealing contact with said valve seat in the closed position, said head portion spherical surface having a diameter greater than the diameter of said valve seat, a valve stop member extending over said valve poppet a spaced distance from said base portion, and a flat leaf spring engaging said poppet flat surface biasing said poppet toward said valve seat.

2. A discharge valve assembly as set forth in claim 1, wherein said base portion flat surface is spaced out of contact with said leaf spring when said head portion is in engagement with said valve seat.

3. A discharge valve assembly as set forth in claim 1, wherein said valve poppet head extends beyond said valve plate inner face into said compressor space when said valve poppet engages said valve seat.

4. A discharge valve assembly as set forth in claim 3, wherein the portion of said outer face of said valve plate adjacent said discharge port and said valve seat is recessed to have a lesser thickness than the thickness of the remainder of said valve plate.

5. A discharge valve assembly as set forth in claim 1, wherein said valve poppet is of a polymeric material.

6. A discharge valve assembly as set forth in claim 5, wherein said polymeric material is a polymeric material is a polyimide resin.

7. A hermetic refrigeration compressor comprising a cylinder block having an end surface, a cylinder bore extending through said cylinder block from said end surface and defining an axis perpendicular to said end surface, a valve plate secured to said end surface and extending across said cylinder bore, a piston mounted for reciprocation in said cylinder bore, means to reciprocate said piston in said cylinder bore to and from said valve plate, a discharge port extending through said valve plate and opening into said cylinder bore, a valve seat surrounding said discharge port on the side opposite said piston, said valve seat having a spherical surface, a valve poppet having a head having a spherical surface engageable with said valve seat, spring means biasing said poppet toward said valve seat, said poppet when in engagement with said valve seat having a central portion extending through said valve seat beyond a surface of said valve plate facing said piston, said piston having an end face extending adjacent said valve plate, said end face including a recessed portion in alignment with said discharge port to receive said central portion of said poppet.

8. A hermetic refrigeration compressor as set forth in claim 7, wherein the portion of said valve plate adjacent to said discharge port is recessed to reduce the thickness of said valve plate in that area.

9. A hermetic refrigeration compressor as set forth in claim 7, wherein said spherical surface extends over the entire surface of said head.

10. A hermetic refrigeration compressor as set forth in claim 7, wherein said valve poppet is of a polymeric material.

11. A hermetic refrigeration compressor as set forth in claim 10, wherein said polymeric material is a polyimide resin.

12. A hermetic refrigeration compressor as set forth in claim 7, including a valve stop member extending over said valve poppet.

13. A hermetic refrigeration compressor as set forth in claim 12, wherein said spring means is a flat leaf spring extending between said poppet and said stop member.

14. A hermetic refrigeration compressor as set forth in claim 13, wherein said valve poppet has a base portion with a flat surface adjacent said flat leaf spring.

15. A hermetic refrigeration compressor as set forth in claim 14, wherein said spring is spaced out of contact with said flat surface when said poppet is in sealing engagement with said valve seat.

* * * * *